3,129,192
ALKYD RESINS FROM COMPLEX ACIDS
Walter E. Kramer, Niles, and Louis A. Joo, Crystal Lake, Ill., assignors to The Pure Oil Company, Chicago, Ill., a corporation of Ohio
No Drawing. Filed Sept. 12, 1960, Ser. No. 55,123
15 Claims. (Cl. 260—22)

This invention relates to alkyd resins derived from complex mixtures of polybasic, polynuclear aromatic, alkyl-aromatic, and heterocyclic, high-molecular-weight, and polybasic acids prepared from selected petroleum fractions, which resins are characterized by their high solubility in more common organic solvents, resistance against attack by alkali and acid, i.e., environments, high self-plasticizing ability, superior dielectric properties, and suitability for wire coatings and similar applications. More particularly, this invention relates to alkyd resins prepared from mono- and polybasic acids derived from solvent extracts wherein the extracts are used as a source of complex high-molecular weight, polynuclear, aromatic, alkylaromatic, condensed-ring heterocyclic, mono- and polybasic acids, through metalation and carbonation reactions and the resulting acids are transformed into alkyd resins by any of the known reactions therefor.

The alkyd resins represent a large group of compounds defined as polyesters of polyhydric alcohols and polycarboxylic acids or anhydrides, e.g., glycerol phthalic anhydride resins. According to "The Technology of Plastics and Resins," P. Mason J. (1947), the alkyd resins (Glyptals) are usually prepared by an esterification reaction as illustrated by the following general equation:

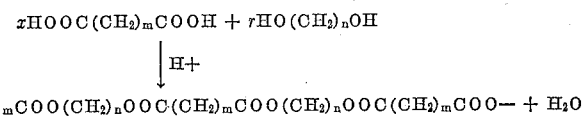

Because both reactants are polyfunctional, the reaction illustrates the growth of a linear polymer by such interaction of functional groups. The nature of the terminal groups in the chain is controlled by the relative number of moles of polybasic acid and polyhydric alcohol used for the reaction. When the acid is in excess, the majority of the terminal groups will be carboxyl, and if the alcohol is in excess, the majority of the terminal groups will be hydroxyl. Using a dicarboxylic acid and a dihydroxy alcohol produces a linear, thermoplastic resin. It is known in this art that resins of the type of cyclic lactides or lactones are formed through cyclization reactions and resins of the cross-linked or net-polymer type are formed, the latter being of greater importance in the field of industrial plastics. The latter type of resins are formed when a component, acid or alcohol, is chosen which is tri-functional. Cross-linking is said to take place in two stages; in the first stage, normal chain growth proceeds by the mechanism of the foregoing reaction, that is through l-esterification, and when about one-third of the free acid remains, or when the rate of linear esterification decreases, β-esterification begins resulting in a rapid decrease of the acid content and the production of a resin is gelled or insoluble state. This β-esterification is noted by the remarkable increases in molecular weight and decreases in solubility and fusibility of the product.

This invention is based on the discovery of the ability of mono- and polybasic complex, high-molecular-weight acids, derived from solvent extracts obtained in the solvent refining of mineral lubricating oils and fractions thereof, to react with polyhydric organic compounds to form alkyd resins which exhibit high solubility, high chemical resistance, have self-plasticizing ability, form superior coatings and have excellent dielectric properties. A feature of this invention is the discovery that the reaction product of polybasic acids derived from solvent extracts and linoleic acid, or dehydrated castor oil, and glycerine forms a superior wire coating enamel.

It becomes then a primary object of this invention to provide a new class of alkyd resins.

An object of this invention is to provide a new class of alkyd resins derived from mono-, di-, and polybasic acids prepared from solvent extracts, obtained in the refining of mineral lubricating oils.

An object of this invention is to provide a new class of alkyd resins prepared by the reaction of polyhydric alcohols and mono-, di-, and polybasic acids prepared from solvent extracts obtained in the refining of mineral lubricating oils.

Another object of this invention is to provide a new class of alkyd resins and a method of preparation by the reaction of polyhydric alcohols and mono-, di-, and polybasic acids, with or without a fatty acid modifier, said polybasic acids being derived from solvent extracts obtained in the solvent refining of mineral lubricating oils and fractions thereof.

Still another object of this invention is to provide a new class of alkyd resins prepared by the reaction of polyhydric alcohols with mono-, di-, and polybasic acid mixtures derived from the high-molecular-weight, complex, polynuclear, aromatic, alkylaromatic and/or heterocyclic compounds present in solvent extracts.

These and other objects of this invention will become apparent or be described as the specification proceeds.

The complex, polynuclear, high-molecular-weight alkylaryl, aryl, or heterocyclic polybasic acids used to prepare the resins of this invention are described in copending application Serial Number 819,932, filed June 12, 1959, by Thomas W. Martinek, now abandoned. Although the polybasic acids may be prepared by the various known methods in the prior art for converting aromatic materials to carboxylic acids, such as are described in said copending application, using solvent extracts as starting materials, the technique set forth in said application represents a preferred method of preparation because of the increased efficiency of the process and the higher yields of polybasic acids of high purity that are obtained. The starting materials for the reaction are well known by-products of the solvent extraction of mineral lubricating oils and are adequately described as those aromatic materials separated from mineral lubricating oils and their fractions, i.e., those aromatics obtained in the manufacture and refining of neutral oils and bright stocks during treatment with a selective solvent designed to extract the predominantly aromatic materials from the paraffinic materials. Solvent extracts resulting from the treatment of mineral lubricating oils for the purpose of separating non-aromatic hydrocarbons (the raffinate and finished oil) from the aromatic hydrocarbons (the extract and waste product) may be used and are preferred as starting materials.

Since the general process of refining mineral lubricating oils in which solvent extracts are obtained is well known, it is only necessary for present purposes to describe a typical procedure for obtaining same and give some examples by way of illustration.

In a typical operation, desalted crude oil is first charged to a distillation unit where straight-run gasoline, two grades of naphtha, kerosine, and virgin distillate are taken off, leaving a reduced crude residue. The reduced crude is continuously charged to a vacuum distillation unit where three lubricating oil distillates are taken off as side streams, a light distillate is taken off as overhead, and a residuum is withdrawn from the bottom of the tower. The residuum is charged to a propane-deasphalting unit wherein propane dissolves the desirable lubricating oil constituents and leaves the asphaltic materials. A typical vacuum residuum charge to the propane-deasphalting unit may have an API gravity of 12.9°, viscosity SUS at 210° F. of 1249, flash 585° F., fire 650° F., C.R. of 13.9 weight percent, and may be black in color. The deasphalted oil may have an API gravity of 21.5° to 21.8°, viscosity SUS 210° F. of 165–175, NPA color 6–7, flash 575° F., fire 640° F., and C.R. of 1.7–2.0. The deasphalted oil and various lubricating oil distillates from the reduced crude are subjected to solvent extraction for the separation of non-aromatic from aromatic constituents prior to use. The refined oil or "raffinate" from the extraction processes is used per se, or as blending stock, for lubricating oils, and the solvent extract, predominating in complex aromatic constituents, is distinctively useful in accordance with this invention.

For example, a crude oil from an East Texas field with an API gravity of 33.1 was topped to remove such light fractions as gasoline, naphtha, kerosine, and a light lubricating distillate. The vacuum residue was a reduced crude having a viscosity of 1251 SUS at 210° F., 2.2 percent sulfur, and an API gravity of 12.6. After propane-deasphalting, the oil had a viscosity of 174 SUS at 210° F. and an API gravity of 21.7. This deasphalted oil was treated with phenol to produce a raffinate from which an aviation lubricating oil could be prepared. The oil extracted by phenol treatment, after removal of phenol, is ready for use as the starting material in accordance with this invention.

Solvents other than phenol may be used to obtain the extraction product used in accordance with this invention, for example, liquid sulfur dioxide, nitrobenzene, Chlorex, chlorophenol, trichloroethylene, cresylic acid, pyridine, furfural, or the Duo-Sol solution (comprising liquid propane and cresol) may be used. When using phenol, it is possible to vary the characteristics of the extract and raffinate products considerably by adjustment of the amount of water present. A raffinate of relatively low viscosity index can be obtained by using a water solution of phenol during the extraction, and a raffinate of high viscosity index can be obtained by using anhydrous phenol. Following are the physical characteristics of typical extract products, from lubricating oil stocks derived from various crude oils and other source hydrocarbon materials, which may be used in accordance with this invention.

TABLE I
*Sources and Physical Characteristics of Solvent Extracts*

| Ext. No. | Crude Source | Solvent | API Grav. | Sp. Gr. at 10° F. | Vis/ 100° F. | Vis/ 130° F. | Vis/ 210° F. | V.I. | Pour | ° F. Flash | ° F. Fire | Iodine No. (Wijs) | Percent C.R. | Percent Sulfur |
|---|---|---|---|---|---|---|---|---|---|---|---|---|---|---|
| 1 | East Tex | Phenol | 11.1 | | 23,319 | 4,750 | 282 | −40 | +55 | | | | 7.2 | 2.66 |
| 2 | do | do | 15.4 | | 15,000 | | 285 | +39 | | | | | | |
| 3 | do | do | 12.6 | | 36,410 | 4,310 | 310.1 | −1 | +80 | | | | 4.7 | 2.27 |
| 4 | do | do | 14.6 | | 19,500 | 4,305 | 313 | +27 | +90 | | | | 4.7 | 2.2 |
| 5 | do | do | 15.4 | | 32,500 | | 372 | +5 | +60 | | | | 4.13 | 2.33 |
| 6 | do | do | 13.7 | | 25,000 | 5,400 | 355 | +27. | +80 | | | | | 2.18 |
| 7 | do | do | 8.6 | | 145,000 | 19,000 | 616 | 0 | +70 | | | | | |
| 8 | do | do | 10.5 | | 12,676 | 2,514 | 172.1 | −101 | +60 | | | | | 2.18 |
| 9 | Sante Fe Springs | do | 10.2 | 0.9984 | | | 371 | | +65 | 520 | 600 | 69.4 | | |
| 10 | Texas | Furfural | 13.0 | 0.9791 | | | 1,500 | | +85 | 470 | 515 | 57.4 | | |
| 11 | Penn | Chlorex | 12.2 | 0.9843 | | | 1,365 | | +85 | 560 | 630 | 71.4 | | |
| 12 | do | Nitrobenzene | 10.0 | 1.000 | | | 1,500 | | +75 | 555 | 640 | 60 | | |
| 13 | Mid-Cont | Propanecresol | 14.4 | 0.9699 | | | 1,500 | | +100 | 540 | 605 | 63.7 | | |
| 14 | do | Phenol | 13.6 | | | | 41.7 | −82 | +20 | | | | | |
| 15 | do | Chlorex | 13.6 | | | | 200 | −61 | +75 | | | | | |
| 16 | do | Phenol | 8.9 | | | | 569 | | +75 | | | | | |
| 17 | do | Furfural | 14.9 | | | | 50.2 | 25 | +20 | | | 610 | | |
| 18 | East Tex | Phenol | 13.5 | .976 | 25,000 | | 341 | 17 | +65 | 530 | 610 | | 5.76 | 2.36 |
| 19 | do | do | 11.1 | | | | 61.5 | −56 | +40 | 435 | 475 | | 0.42 | 2.7 |
| 20 | do | do | 13.7 | | | | 360 | +25 | +65 | 550 | 630 | | 5.5 | 2.3 |
| 21 | do | do | 7.7 | | | | 71.1 | −128 | +35 | 420 | 495 | | 0.86 | 3.2 |
| 22 | do | do | 7.3 | | | | 796 | −76 | +65 | 520 | 610 | | 7.7 | 3.0 |

The solvent extracts from lubricating oils used as starting materials for this invention have the following general properties and characteristics.

TABLE II

| Characteristic: | Range of value |
|---|---|
| Gravity, ° API | 8.0–15.0. |
| Gravity, sp., 380/15.5° C. | 0.9550–1,000. |
| Viscosity SUS @ 100° F. | 350–25,000 (Ext.). |
| Viscosity SUS @ 130° F. | 140–19,000. |
| Viscosity SUS @ 210° F. | 200–1500. |
| Viscosity index | −101–+39. |
| Pour point (max) | +35–100. |
| Color NPA | +2–5D. |
| Molecular weight, average | 320–600. |
| Boiling point (initial), ° F. | 300–1000. |
| Boiling point (end), ° F. | 400–1200. |
| Sulfur, percent wt. | 2.0–4.5. |
| Sulfur compounds, percent wt. | 20–50. |
| Aromatics and thio compounds | 50–90. |
| Thio compounds | 14–40. |
| Neutral aromatic hydrocarbons | 40–51. |
| Av. No. of rings/mean arom. mol. | 1.7–3.5. |
| H/C wt. ratio | 0.116–0.136. |
| H/C atom ratio, whole sample | 1.383–1.622. |
| H/C atom ratio, aromatic portion | 1.289–1.500. |
| Nearest empirical formula | $C_{22}H_{30}$—$C_{44}H_{66}$. |

The gravities of the extracts in general increase with increase in the viscosity of the raffinate at a constant viscosity index. Stated otherwise, the gravities of these extracts increase with decrease in viscosity index of the raffinate at a constant viscosity. For the production of 100±5 V.I. neutral oils, the viscosities of the extracts increase with increase in stated viscosities of the neutral oils (raffinates). The pour points of extracts are high and are affected by changes in the depth of extraction. The sulfur contents are also affected by the depth of extraction. The solvent extracts are characterized by containing aromatic and sulfur compounds in the range of 70–90%, the remainder being principally saturates, or material behaving as saturates, together with a minor proportion of from 3.0 to 6.0% of organic acids. The organic acids present are not susceptible to extraction by the use of aqueous strong caustic because of emulsion formation. Very little asphaltic material is present in solvent extracts and they contain no materials volatile at room temperatures.

The materials shown in Tables I and II are merely illustrative and the invention is not to be limited thereby.

It is apparent that the composition and characteristics of the acids, or resins prepared therefrom, will vary somewhat depending on the concentration and types of polynuclear aromatic hydrocarbons in the solvent extracts used. In such complicated mixtures as solvent extracts from petroleum oils, and solvent extracts from lubricating oil fractions, the content of aromatic materials may vary from about 20% to 100% by weight.

It is to be understood, accordingly, that the invention is broadly applicable to any petroleum fraction which contains at least about 20% by weight of reactable polynuclear aromatic hydrocarbons as herein defined. These types of complex aromatic hydrocarbons are found in high concentrations in solvent extracts obtained in the manufacture of neutrals and bright stocks, all of which materials are to be understood as suitable starting materials.

It is to be understood that the invention is particularly applicable to any solvent extract from the refining of mineral lubricating oils for the purpose of separating nonaromatic and aromatic hydrocarbons, that is, where the solvent exerts a preferential selectivity for the nonparaffinic constituents. The extracts are substantially freed of solvent, e.g., phenol extracts are dephenolized by steam stripping, so that they contain practically no solvent.

In preparing the polybasic acids to be used in accordance with this invention, the starting solvent extract material is reacted first with an alkali metal in elementary form. For this purpose sodium, lithium, potassium, rubidium and cesium, and mixtures and alloys of these, may be used, that is, members of group IA of the periodic chart of the atoms, Hubbard, 1941, revised chart. About 30 parts of solvent extract are used per 1 to 5 parts of alkali metal. The reaction may be carried out at temperatures as low as $-60°$ C. and as high as $80°$ C. The prior art solvents for this type of reaction, such as dimethyl glycol ether, dimethyl ether, methyl alkyl ethers, dialkyl glycol ethers, tetrahydrofuran, dioxane and trimethylamine may be used.

The reaction of the alkali metal with the reactive complex aromatic components does not occur unless steps are taken as shown in said copending application to overcome the effects of certain reactive impurities in the complex mixture which normally coat the sodium surface and prevent reaction. The undesirable reactive impurities present in the mineral oil mixture may be traces of water, organic acids, mercaptans and other sulfur compounds, phenol, and other nitrogen- or oxygen-containing compounds. The reaction can be advantageously effected if fresh sodium surfaces are continuously exposed until all undesired reactive impurities have reacted, or if sufficient sodium surface to react with all such impurities plus a moderate excess is used. Another expedient is to use a large excess of sodium metal. It appears that once the undesired reactive impurities have reacted, the desired reaction can take place on the excess clean sodium surface. It also appears that once the complexing reaction occurs, the oil solution of complex begins to dissolve the undesired reaction product coating from the sodium surface, in effect cleaning the particle surface and rendering more surface available for reaction.

The reaction is difficult to start unless an excess of sodium and fresh sodium surface is used. Certain expedients have been found advantageous. Among these are continuous shearing of the sodium particles until the reaction starts. This has been accomplished with a Brookfield counter-rotating stirrer. Other shearing or crushing devices, such as a Waring Blendor, colloid mills, mullers, ball mills, and the like, also may be used. Even with continuous shearing or crushing, many minutes and sometimes hours are required before the desired complexing reaction starts. The length of time required depends on the relative amounts of undesired impurities present, and the sodium surface made available. The inhibiting or dominating effect of the undesirable reactive impurities is one reason why petroleum hydrocarbon sources were not exploited as starting materials for this type of reaction.

Another expedient found advantageous resides in the use of preformed sodium dispersion in an inert liquid. Such dispersions and their preparation are well known in the art. According to said application Serial No. 819,932, a large excess of dispersed sodium must be used to initiate the reaction, unless steps are taken to remove the coating of undesired reaction products from the sodium surface. Such steps include the use of mills.

Still another expedient, and the preferred one, is the actual preparation of a sodium dispersion in the solvent extract to be reacted. The undesirable impurities appear to completely react with the sodium during preparation of the dispersion, and as a consequence, clean sodium surface is available for the desired reaction as soon as the "active ether" is mixed with the sodium-reactive-component mixture. The desired reaction then is practically instantaneous and proceeds smoothly and rapidly to completion with only a slight excess of sodium.

When the reaction with alkali metal is complete, as evidenced by its dissolution, the reaction mixture is treated with carbon dioxide, either at about the same or a different temperature as was used during the reaction with alkali metal. The reaction mixture is next washed with water and allowed to separate into a solvent phase and a water phase. Several applications of 1 volume of water per 5 volumes of reaction mixture may be used and the water layers collected. Counter-current water-washing may be used. The resulting water phase is acidified with an acid such as a hydrohalic, sulfuric acid, or phosphoric acid. This causes the polybasic, polynuclear aromatic acids to separate or precipitate from the aqueous mixture.

EXAMPLE I

A mixture of polybasic acids from aromatic extract oil, derived from a petroleum lube oil stock by phenol extraction in the preparation of 170 vis., 100 V.I. neutral oil, was prepared by the following procedure. A solution of 100 g. of aromatic oil in 675 cc. of dry tetrahydrofuran was placed in a 2100-cc. flask equipped with a Brookfield counter-rotating stirrer and gas-inlet and -outlet. The solution was cooled and maintained at 10–30° C. while 8.3 g. of metallic sodium in the form of $3/16"$ cubes were added, after which cooling was maintained during a two-hour reaction period. No complex formation appeared to occur until approximately 25 minutes had elapsed. Thereafter, a strong color change was noted and the reaction appeared to proceed relatively rapidly.

After stirring for two hours, the mixture was cooled to $-60°$ C. while an excess of carbon dioxide gas was introduced. The color was discharged by reaction with carbon dioxide, but no precipitation was noted. The unreacted sodium (5.1 g.) was removed, the tetrahydrofuran was stripped from the reaction mixture by applying a vacuum, after which the remaining liquid was combined with ether and washed with water.

The resulting aqueous phase was acidified and washed with ether to recover the free acids and other reaction products. About 89% w. of the original oil feed stock was recovered, and about 11% had reacted to form the acidic product of this invention. The product had an indicated average molecular weight of 686 and a saponification value of 171. The calculated equivalent weight was 328 indicating 2.1 acid groups per molecule. However, the true average molecular weight probably was somewhat lower than 686, the indicate average molecular weight being higher than actual because of molecular association in the benzene solvent during its determination. Extract No. 18 of Table I was used in this example.

EXAMPLE II 100 gms. of solvent extract and 675 ml. of dry tetrahydrofuran were charged to a one-liter, 3-necked flask equipped with a stirrer, thermometer, pressure-equalized drop-funnel, gas-inlet with rotometer, and gas-outlet. A dry nitrogen atmosphere was maintained. Approximately 100 gms. of Alundum balls 5/16" diameter were charged and agitation started. The solution was cooled to −20° C. and 8.3 gms. of sodium as a 20% dispersion in toluene were added. After 5 minutes, no reaction had occurred and the solution was allowed to warm. After 25 minutes, the temperature had risen to −7° C. and a few particles of sodium appeared to be reacting, i.e., the deep color of the complex was seen to be forming on the surface of a few particles when agitation was momentarily stopped. Within an additional 17 minutes, the reaction was proceeding smoothly and the dry carbon dioxide atmosphere was introduced to the flask in excess at −18° C. over a period of 78 minutes. The reaction mixture was worked up as in the previous example after the excess sodium was destroyed with water. Hydrogen evolution from the remaining sodium indicated that only 48% of the sodium had reacted. Approximately 84.5% of the oil was recovered, indicating 15.5% had reacted. The acids recovered weighed 22.5 gms. and had a saponification value of 241, indicating an equivalent weight of 233, and contained 2.8% sulfur. With a similar experiment, the acids recovered had a saponification value of 323, indicated 173 equivalent weight, with an indicated average molecular weight (cryoscopic) of 600. They contained 3.0% sulfur. The ratio of molecular weight to equivalent weight was 3.4, indicating a mixture containing acids with more than 2 acid groups per molecule. Extract No. 18 of Talbe I was used in this example.

Suitable carrier liquids to form the initial mixture of alkali metal may be any solvent which is non-reactive in relation to the alkali metal and which does not interfere with the reactions taking place. The filter press used may be of the plate-and-frame type employing kieselguhr or diatomaceous earth as the filter aid or filter means. The water used in the process should be free of reactable salts and other impurities. Ordinary water-purification precautions applicable to organic synthesis should be applied to insure against contamination of the end products from this source. The hydrocarbon solvent used may be any liquid, or liquefiable, inert, aliphatic hydrocarbon. Propane, butane, heptane, octane, etc., may be used for this purpose of removing unreacted oil from the mixture. The solvents used in stripper operations may be any ether or ketone having an appreciable solubility for the complex acids product. Included in this category are methyl ethyl ketone, diethyl ketone, acetone, methyl ether, diethyl ether, propyl ether, and dibutyl ether. Mixed ethers and ketones are also useful. The acid used may be hydrochloric, sulfuric, phosphoric, and the like; non-mineral acids such as acetic and chloroacetic may also be used.

In operating the process on a continuous basis, solvent-extract oil and alkali metal are pumped through heat exchangers to a colloid mill where the alkali metal, in this case sodium, is dispersed in the reactant extract oil. The dispersion passes through a cooling heat-exchange into a second colloid mill where it is intimately mixed with solvent (such as tetrahydrofuran). The reaction mixture then passes through cooling heat-exchangers to mixing- and carbonating-vessel where carbon dioxide is introduced by means of a manifold. The carbonated solution is pumped from reactor by means of a pump to a final carbonation zone where excess carbon dioxide is injected under pressure.

The carbonated mixture then passes to a continuous rotary filter from which unreacted sodium and other insoluble materials are removed, and the filtrate passes in heat-exchange contact with the dispersion in an exchanger by means of a suitable chamber. The effluent from the exchanger passes to the top of tower wherein solvent is removed overhead and conveyed by a pump through heat exchangers and the chamber.

The residue is conveyed to a continuous extraction tower where water and ether are introduced countercurrently. The hexane phase is stripped in another tower to recover unreacted oil as bottoms. The ether is condensed and conveyed to a second continuous extraction tower into which mineral acid (hydrochloric acid) and the alkaline extract from the continuous extraction tower are introduced countercurrently. The water (acidic) phase is discarded or treated for water recovery. The upper phase is stripped, whereby an overhead ether fraction is taken off and the polybasic product is recovered.

The polybasic, polynuclear aromatic acids thus prepared are condensed with polyhydric alcohols to form the alkyd resins of this invention. The properties of the resins are altered as desired by varying the types and proportions of reactants, by varying the reaction conditions or by incorporating unsaturated fatty acids as modifiers and combinations of the expedients. Twenty-five alkyd resins were prepared in which the type of fatty acid, the type of polyol, and the polybasic extract acid concentration were varied. Also, other dibasic acids such as maleic anhydride and itaconic acid were incorporated.

The following procedure was used for the preparations. The polybasic extract acid, fatty acid, and glycerine were put into a resin kettle. To decrease the viscosity of the molten resin and to promote the removal of water, xylene was included. Heat was applied and agitation was started as soon as the polybasic extract acid melted. Nitrogen was introduced to provide an inert atmosphere. As the temperature reached 270° F., the xylene was removed continuously until the temperature reached 450° F. When the acid number of the resin dropped below 5-6, the heating was discontinued and run was completed. The following table shows the results from several representative runs made using the extract polybasic acids prepared from extract oil No. 21 (Table II).

TABLE III

*Composition and Properties of EPA Alkyd Resins*

| Run No. | Composition,[1] Percent | | | Type of FA | Final Acid No. of Resin | Air-Drying Properties | Baking Properties |
|---|---|---|---|---|---|---|---|
| | EPA | FA | GL | | | | |
| 1 | 36.5 | 51.3 | 12.1 | Soya | 2.0 | Poor | Fair. |
| 2 | 36.5 | 51.3 | 12.1 | Linoleic | 2.0 | Fair | Medium. |
| 3 | 36.5 | 51.3 | 12.1 | Corn | 5.0 | Poor | Fair. |
| 4 | 36.5 | 51.3 | 12.1 | Tall Oil | 5.0 | ____do____ | Do. |
| 5 | 35.8 | 50.3 | 14.0 | Coconut | 5.0 | ____do____ | Poor. |
| 6 | 36.5 | 51.3 | 12.1 | DCO [2] | 5.0 | Good | Good. |
| 7 | 36.6 | 51.5 | 11.9 | DCO | 6.0 | ____do____ | Do. |
| 8 | 36.2 | 50.9 | [3]12.8 | DCO | 6.0 | ____do____ | Do. |
| 9 | {31.7 / [4]4.0} | }50.2 | 14.1 | DCO | 5.5 | Fair | Do. |
| 10 | {32.0 / [5]4.0} | }50.6 | 13.5 | DCO | 5.0 | ____do____ | Do. |
| 11 | 18.1 | 70.5 | 11.3 | DCO | 2.7 | Poor | Poor. |
| 12 | 27.4 | 60.9 | 11.7 | DCO | 5.5 | ____do____ | Do. |
| 13 | 46.4 | 41.3 | 12.3 | DCO | 5.0 | Good | Good. |
| 14 | 55.0 | 32.6 | 12.3 | DCO | 4.5 | ____do____ | Do. |
| 15 | 64.0 | 22.8 | 13.0 | DCO | 5.0 | Dries without drier. | Medium. |
| 16 | 73.9 | 12.7 | 13.5 | DCO | 11.0 | ____do____ | Do. |
| 17 | 82.3 | 4.2 | 13.5 | DCO | 1.0 | ____do____ | Fair. |
| 18 | 86.7 | 0.0 | 13.5 | DCO | 1.0 | ____do____ | Poor. |

[1] EPA=Extract polybasic acid; FA=Fatty acids; GL=Glycerine.
[2] DCO=Dehydrated castor oil acid.
[3] Pentaerythritol was used instead of glycerine.
[4] Maleic anhydride was added to the EPA.
[5] Itaconic acid was added to the EPA.

The polyhydric alcohols to be used to prepare the resins of this invention include any organic compounds having three or more hydroxyl groups in the molecule. Examples of polyhydric alcohols are given as follows:

The trihydric alcohols and higher polyhydric alcohols—
    Glycerol
    Diglycerol
    Butantriol-1,2,3
    Glyoxal The tetrahydric alcohols i-erythritol and optically active forms thereof—pentaerythritol The pentahydric alcohols $(CH_2OH(CHOH)_3CH_2OH)$ and isomers thereof—
    Adonitol
    The riboses
    d- and l-arabitol
    Xylitol The hexahydric alcohols $(CH_2OH(CHOH)_4CH_2OH)$—
    d-Mannitol
    d-Sorbitol
    d-Iditol
    Dulcitol The heptahydric alcohols—
    Perseitol
    Volemitol The fatty acids used in accordance with this invention as modifiers include the saturated and unsaturated fatty acids and their mixtures from such sources as:

Vegetable oils—
    Babassu oil
    Castor oil
    Coconut oil
    Corn oil
    Cottonseed oil
    Hempseed oil
    Linseed oil
    Poppyseed oil
    Safflower oil
    Sunflower oil
    Tung oil
    Mustard oil
    Olive oil
    Oiticica oil
    Palm oil
    Palm kernel oil
    Peanut oil
    Perilla oil
    Rapeseed oil
    Soybean oil
    Tall oil (commercial)
    Walnut oil
Animal fats and oils—
    Butter fat
    Lard
    Neat's-foot
    Tallow (beef)
    Tallow (mutton)
Marine fats and oils—
    Herring
    Menhaden
    Sardine
    Sperm (body)
    Sperm (head)
    Whale The foregoing are sources of such saturated fatty acids as caproic, caprylic, capric, lauric, myristic, palmitic, stearic, arachidic, behenic and lignoceric acids, that is, saturated fatty acids having from 6 to 24 carbon atoms. The unsaturated fatty acids include lauroleic, myristoleic, palmitoleic, oleic, gadoleic, erucic, ricinoleic, linoleic, linolenic, eleostearic, licanic, arachidonic and clupanodonic acids to include those having from 12 to over 26 carbon atoms per molecule. Rosin acids, conjugated acids, hydroxy acids and terpenic acids in this series are also included. The hydrogenated and dehydrated forms thereof are intended as reactants for the preparation of the resins of this invention. A preferred group of acids include dehydrated castor oil fatty acids comprising 1–2% palmitic, 1–2% stearic, 0–8.5% oleic, 86–92% ricinoleic, and 3–6% linoleic acids. A preferred species of the dehydrated castor oil fatty acids contains about 2% palmitic acid, about 1% stearic acid, about 7% oleic acid, about 87% ricinoleic acid, and about 3% linoleic acid. Dehydrated corn oil acids, dehydrated hempseed acids, and dehydrated cottonseed acids may also be used.

In preparing the alkyd resins of this invention, any of the known esterification procedures may be used. The reaction may be carried out in the usual manner by refluxing the polybasic extract acid (EPA) and alcohol with a small amount of sulfuric acid, fatty acid, hydrogen chloride or arylsulfonic acid. The equilibrium is shifted to the right by an excess of one of the reactants or by the removal of water, either by azeotropic distillation or by means of a suitable drying agent. In some instances the necessity for continuous drying may be eliminated by using methylene or ethylene chlorides as solvents. In carrying out the reaction at room temperature, a small amount of an acid chloride such as thionyl chloride, acetyl chloride, or stearoyl chloride may be used. Such other catalysts as boron trifluoride, trifluoroacetic anhydride, zinc dust and the like may be used. The reaction takes place with most polyhydric alcohols at temperatures between about 70° F. to 500° F. using atmospheric or superatmospheric conditions. Because the methods of esterification applicable to the reaction herein are well known, there is no necessity for further description.

By collecting the water produced during the reaction, and plotting the volume thereof against time, the course of the esterification can be followed. Applying this principle to run No. 12 of Table III showed that the reaction proceeded easily without a catalyst and reached equilibrium in about 180 minutes. This was comparable to the reaction of phthalic anhydride and glycerol and showed the polybasic extract acids to be about as reactive as phthalic anhydride.

As in the case of phthalic alkyd resins, gelation may occur if the polybasic extract acids are present in amounts above about 45%. These gels are infusible and insoluble in any solvent. An unmodified alkyd resin was made with a polybasic extract acid content of 94.7%. This resin was fluid when hot, and hard and brittle at room temperature, but was still soluble in xylene. In the case of modified alkyd resins made from polybasic extract acids, the viscosity of the alkyd increases with increasing polybasic extract acid content. Above a polybasic extract acid content of about 64%, the resins are hard and brittle.

The polybasic extract acids, from which the resins of this invention are made, are solid, dark, glossy materials having an unpleasant odor. The resins prepared therefrom are practically odorless. During the esterification, 2–9 g. of a yellow oil was collected which had a very unpleasant odor. The oil was analyzed by infrared spectroscopy and found to be mostly saturated ketones, probably in the $C_6$–$C_8$ range.

Because of their unique chemical and physical properties, the alkyd resins of this invention have many uses, such as wire coatings, water resistance films formation, baked enamels, adhesives, and similar applications. The properties of the resin and the coating, film, or other product produced therefrom, are subject to control depending on the polybasic extract acid content of the resin, the fatty acid modifier used, the type of drying agent present, the conditions of baking, and other factors. Some of these properties and other advantages of the resins are illustrated as follows.

For film casting, the resins were diluted with xylene. The original viscosity of several polybasic extract acid alkyds and the viscosity of the 70% alkyd solution are given in Table IV.

TABLE IV

*Viscosity of Alkyd Resins*

| Polybasic Extract Acid Content of the Resin, Percent | Original Viscosity (Stokes) | Vis. of the 70/30 Xylene Solution (Stokes) |
|---|---|---|
| 70 | solid | 6.27 |
| 60 | >148 | 2.25 |
| 40 | 98.5 | 0.65 |
| 20 | 5.0 | >0.50 |

To evaluate the resins for hardness and drying time the Sward hardness rocker was used. The device consists of a rocker and an electronic counting mechanism. A panel coated with the resin is placed on a table; the rocker is put on the panel and released. The swinging of the rocker interrupts a light beam and the number of oscillations is counted automatically. The results can be given in two ways.

(1) For hard films: The number of oscillations above a fixed amplitude ("Sward hardness").
(2) For soft films: The number of seconds until the rocker comes to complete rest ("rocking time").

The second method is more sensitive and consequently is used most often. The harder the resin film, the longer is the "rocking time." Evaluation of resins #2 and #6 is shown in Table V.

TABLE V

| Resin No. | Fatty Acid Type | Drying Time (hrs.) | Rocking Time (secs.) |
|---|---|---|---|
| 2 | Linoleic acid | 4½ | 2.2 |
| 2 | ---do--- | 24 | 10.6 |
| 2 | ---do--- | 41 | 20.0 |
| 2 | ---do--- | 65.0 | 27.8 |
| 2 | ---do--- | 117.0 | 36.0 |
| 2 | ---do--- | 210 | 44.0 |
| 6 | Dehydrated castor oil | 4.0 | 9.0 |
| 6 | ---do--- | 24 | 41.0 |
| 6 | ---do--- | 65.0 | 58.0 |
| 6 | ---do--- | 117.0 | 55.0 |
| 6 | ---do--- | 65.0 | 60.0 |
| 6 | ---do--- | 210.0 | 69.0 |

The air-drying and baking properties of modified alkd resins depend upon the amount and position of the double bonds in the fatty acid portion of the alkyd molecule. Since the polybasic extract acids are only slightly unsaturated (bromine number=18–22), the unsaturated fatty acids used as modifiers contributed most to the resin unsaturation. Despite the fact that the linoleic acid has the same degree of unsaturation (Br No. 99) as the dehydrated castor oil (Br No. 97) acid, the latter imparts better drying properties because 30% of its double bonds are conjugated. The comparison in drying time of resins made with these two acids is also given in Table V. In both resins the polybasic extract acid content was 36.5% (runs #2, 6 in Table III) and 0.2% cobalt was added to promote drying.

Modified alkyd resins #14 and #15, made with dehydrated castor oil acids, using 55% and 64% polybasic extract acids respectively were evaluated on the Sward hardness rocker. The results are shown in Table VI.

TABLE VI

*Air Drying Properties Without Drying Agent*

| Test No. | Resin No. | Rocking Time (secs.) | Drying Time (hrs.) |
|---|---|---|---|
| 1 | 14 (Polybasic Acid Content 55.0%) | 3.0 | 5.0 |
| 2 | ---do--- | 3.0 | 20.0 |
| 3 | ---do--- | 3.0 | 140.0 |
| 4 | ---do--- | 3.0 | 280.0 |
| 5 | ---do--- | 3.0 | 490.0 |
| 6 | ---do--- | 3.5 | 640.0 |
| 7 | ---do--- | 18.0 | 765.0 |
| 8 | 15 (Polybasic Extract Acid Content 64%) | 43.0 | 1.0 |
| 9 | ---do--- | 59.0 | 20.0 |
| 10 | ---do--- | 96.0 | 140.0 |
| 11 | ---do--- | 87.0 | 280.0 |
| 12 | ---do--- | 105.0 | 495.0 |
| 13 | ---do--- | 100.0 | 625.0 |
| 14 | ---do--- | 83.0 | 760.0 |

The results are divisible into two parts. Above 64% polybasic extract acid content the resins are solids. As soon as the solvent had evaporated, a "tack-free" film resulted. Consequently, the tests No. 8 and 9 for resin #15 represent the change that takes place during drying by solvent evaporation, or so-called "apparent air-drying." The film so formed consists of high-molecular-weight, unsaturated polymers which react further and cross-link at a slow rate. This is represented by the changes taking place from test No. 9 to test No. 13, or so-called "actual air-drying." The resins with 55% or lower polybasic extract acid content, as represented by resin No. 14 did not air-dry and were still tacky after 500 hours. The films with 64% or more polybasic extract acid content, as represented by resin No. 15, were of poor quality, low mar-resistance, and exhibited poor adhesion.

As a result of these tests, resin No. 6 was evaluated in the Sward hardness rocker with a drier being used in the preparation of the test film. These results are shown in Table VII.

TABLE VII

*Air Drying Properties With a Drier*

[Resin No. 6]

| Test No. | Drying Agent | Rocking Time (secs.) | Drying Time (hrs.) |
|---|---|---|---|
| 15 | Cobalt Naphthenate (0.05% Co) | 7.0 | 2.0 |
| 16 | ---do--- | 3.5 | 4.0 |
| 17 | ---do--- | 6.0 | 18.0 |
| 18 | ---do--- | 4.0 | 24.0 |
| 19 | ---do--- | 3.0 | 41.0 |
| 20 | ---do--- | 6.5 | 66.0 |
| 21 | ---do--- | 11.0 | 118.0 |
| 22 | ---do--- | 20.0 | 164.0 |
| 23 | ---do--- | 22.5 | 210.0 |
| 24 | ---do--- | 26.0 | 260.0 |
| 25 | ---do--- | 30.0 | 354.0 |
| 26 | Cobalt Naphthenate (0.10% Co) | 14.0 | 16.0 |
| 27 | ---do--- | 21.0 | 24.0 |
| 28 | ---do--- | 34.0 | 42.0 |
| 29 | ---do--- | 41.0 | 64.0 |
| 30 | ---do--- | 46.0 | 118.0 |
| 31 | ---do--- | 51.0 | 164.0 |
| 32 | ---do--- | 65.0 | 210.0 |
| 33 | ---do--- | 67.0 | 260.0 |
| 34 | ---do--- | 57.0 | 356.0 |
| 35 | Cobalt Naphthenate (0.20% Co) | 10.0 | 2.0 |
| 36 | ---do--- | 41.5 | 16.0 |
| 37 | ---do--- | 47.0 | 40.0 |
| 38 | ---do--- | 57.5 | 64.0 |
| 39 | ---do--- | 61.0 | 166.0 |
| 40 | ---do--- | 70.0 | 210.0 |
| 41 | ---do--- | 78.0 | 260.0 |
| 42 | ---do--- | 70.0 | 354.0 |

The use of a combination of cobalt naphthenate (0.10% Co) and calcium naphthenate (0.5% Ca), the latter having little or no drying action by itself and termed an "auxiliary drier," in resin No. 6 decreased the drying time to 22 hours to attain a rocking time of 51 seconds. At 74 hours the rocking time was 64 seconds, and at 166 hours the rocking time was 73 seconds, using the combination of cobalt napthenate and calcium naphthenate in No. 6 resin.

The effect of baking time and temperature upon the hardness of the resin films formed from resin No. 6 was evaluated using the Sward hardness machine. The resin films baked rapidly and exhibited no film discontinuities (eyeholes, craters, etc.). Preliminary tests revealed that with increasing polybasic extract acid content, the flexibility and adhesion of the film decreased. Although the prior art teaches the use of various driers, and it is common to use 0.1 to 0.2 wt. percent of zinc and/or 0.005 to 0.01 wt. percent cobalt in forming baked films, the resins of this invention form high-quality baked films without the use of any drier other than the iron present in the polybasic extract acids.

Infrared analyses of the resin films at intervals during the baking period were made to follow the chemical changes taking place. These analyses revealed that the chemical changes were influenced more by the variation in film thickness than by the baking time. With increasing baking time, the number of conjugated double bonds decreased and the lowest value was attained after 15 minutes of baking. The infrared analyses revealed that cross-linking with —C—O—C— bonds was taking place, these bonds attained a maximum concentration in 15-20 minutes of baking time, and that the concentration then decreased. In the first fifteen minutes of baking there was an increase in carbonyl and hydroxyl groups in the film. Most of the chemical changes occurred within the first 35-40 minutes of baking.

The influence of the baking schedule on the physical properties of the alkyd resins of this invention was also evaluated. Various films were cast at 1 mil "wet thickness," which after baking produced films of 0.4 to 0.5 mil dry thickness. The results of a series of tests on resin No. 6 are shown in Table VIII.

TABLE VIII

*Effect of Baking Time and Temperature Upon Film Hardness*

[Resin No. 6]

| Baking Temperature, °C. | Baking Time (mins.) | Sward Hardness |
| --- | --- | --- |
| 120 | 10.5 | 0.0 |
| 120 | 55.0 | 4.0 |
| 120 | 120.0 | 10.0 |
| 120 | 180.0 | 10.0 |
| 140 | 5.0 | 0.0 |
| 140 | 32.0 | 4.0 |
| 140 | 60.0 | 17.0 |
| 140 | 120.0 | 17.0 |
| 160 | 5.0 | 3.0 |
| 160 | 35.0 | 12.0 |
| 160 | 50.0 | 20.0 |
| 160 | 100 | 22.0 |

The data in Table VIII was checked with duplicate samples at the indicated temperatures and close agreement was obtained. The optimum baking time and temperature for resin No. 6 was determined to be about 60 minutes at about 160° C.

The resins of this invention exhibit high chemical resistance, particularly in the form of baked films. Numerous baked-film strips on various metal and glass surfaces were prepared, and the test strips were immersed in cold water, salt water, kerosene, xylene and detergent for one week. None of the test strips showed any change except those immersed in xylene which showed a slight softening of the film at the end of the test period. However, after being removed from the xylene these test strips recovered their original hardness after 20-30 minutes in contact with the air. These tests indicated that chemical resistance was influenced by the curing or baking time and best resistance was obtained at baking times of about 30 minutes to 1 hour at 160° to 180° C.

Further tests showed that the flexibility and adhesion of the air-dried and baked films, as measured on a conical mandrel and impact tester, was a function of the polybasic extract acid content of the resin. Increase in the polybasic extract acid content decreased the toughness, flexibility and adhesion, and increased the hardness of both the air-dried and baked films. At a polybasic extract acid content of 40-70%, the air-dried and baked films exhibited the highest degree of hardness and flexibility. Soft films were formed of resins having a polybasic extract acid content of below 40% and above 64% acid content. The films began to show brittleness and resembled the properties of the polybasic acids themselves. Resins having 64% to 70% acid content, however, were found to exhibit desirable adhesion and toughness, making them useful for many purposes. The resins having an acid content of below 40% find utility as caulking compounds, filters, ingredients for plastic cements and marine glue.

The air-dried and baked films formed from the resins of this invention find utility as wire enamels or coatings because of their electrical resistance as measured by the dielectric strength and dielectric constant. The dielectric strength of an insulator is the voltage which must be applied to cause an arc or spark discharge through the resin film or insulator. This value is expressed in volt/mils and is a function of the film thickness. The dielectric constant is a measure of the ability of a material to store electrostatic field energy in the presence of an electrical field. In a given capacitor, using the resin or material as a dielectric, a high dielectric constant indicates a high electrostatic capacity. Table IX gives the dielectric strength and dielectric constant of some known plastics and insulators in comparison with resin No. 6.

TABLE IX

*Dielectric Strength and Dielectric Constants*

| Plastic | Thickness (mils) | Dielectric Strength | Dielectric Constant at 10³ cycles |
| --- | --- | --- | --- |
| Polyvinyl chloride | 125 | 300-2,000 | 6.5-12.0 |
| Vinylidene chloride | 125 | 350-500 | 2.5-5.0 |
| Nylon | 125 | 380-470 | 4.0-10.0 |
| Polyethylene | 125 | 400-460 | 2.3 |
| Wire coating enamel | 125 | | |
| Polystyrene | 5 | 3,500 | |
| Do | 15 | 2,200 | |
| Do | 125 | 600 | |
| Resin No. 6 | .5 | 5,000 | |
| Do | 1.0 | 3,700 | |
| Do | 1.6 | 2,300 | |

From the foregoing description, the invention is seen to relate to alkyd resins of the formula

[—OOCRCOOR'OOCRCOOR'OOCRCOO—]$_x$ wherein R is the portion of solvent extracts reactable with alkali metals followed by reaction with carbon dioxide to form polybasic acids and is composed of compounds characterized by complex, polynuclear, aryl, alkaryl, and/or heterocyclic nuclei, R' is the hydrocarbon portion of a polyhydric alcohol, and $x$ has a value of 2 to 8. The R group is defined as a reactable portion of solvent extract, and has attached to it at least one carboxyl group reactable with an alcohol to form an ester. Although some of the individual ester molecules may comprise simple esters, the main portion of the ester or mixture of ester and polyester products will have 2, 3, or more RCOO— groups and also 2 or more R' groups from the polybasic nature of the acids and the polyhydroxy nature of the alcohols. The terms residue of solvent extracts and reactable portion of solvent extracts have been used synonymously herein to mean the complex organic portion of the extracts in the products resulting from metalation, carbonation, and acidification, in accordance with the process of application Serial Number 819,932, exclusive of the carboxyl groups.

The embodiments of the invention, in which an exclusive property or privilege is claimed, are defined as follows:

1. The alkyd resin reaction product under esterification conditions of
   (1) a carboxylic acid prepared from solvent extracts obtained in the solvent refining of mineral lubricating oils used a solvent selective for aromatic compounds, by reaction of said solvent extracts with an alkali metal to form the alkali metal adduct, carbonation of said adduct to form the corresponding alkali metal salt of a carboxylic acid and acidification of said salt to form the free acid, said carboxylic acid being thus characterized by having complex, polynuclear, aromatic, alkyl-aromatic and heterocyclic nuclei predominating in carbon and hydrogen, containing about 2.0 to 4.5% by weight of combined sulfur and also containing oxygen and nitrogen, having an average molecular weight of about 320 to 600, and having about 1.7 to 3.5 average number of aromatic rings per mean aromatic molecule, and
   (2) a polyol having from 3 to 20 carbon atoms to the molecule and 3 to 7 hydroxyl groups to the molecule.

2. Alkyd resins in accordance with claim 1 in which said carboxylic acid is a mixture of mono-, di- and polycarboxylic acids resulting from said metalation, carbonation and acidification reactions.

3. Alkyd resins in accordance with claim 1 in which the amount of said carboxylic acid reacted with said polyol is about 20% to about 94.7% based on the total weight of reactants.

4. Alkyd resins in accordance with claim 3 in which the amount of said carboxylic acid reacted with said polyol is about 40% to 70% based on the total weight of reactants.

5. The modified alkyd resin reaction product under esterification conditions of
   (1) a carboxylic acid prepared from solvent extracts obtained in the solvent refining of mineral lubricating oils using a solvent selective for aromatic compounds, by reaction of said solvent extracts with an alkali metal to form the alkali metal adduct, carbonation of said adduct to form the corresponding alkali metal salt of a carboxylic acid and acidification of said salt to form the free acid, said carboxylic acid being thus characterized by having complex, polynuclear, aromatic, alkyl-aromatic and heterocyclic nuclei predominating in carbon and hydrogen, containing about 2.0 to 4.5% by weight of combined sulfur and also containing oxygen and nitrogen, having an average molecular weight of about 320 to 600, and having about 1.7 to 3.5 average number of aromatic rings per mean aromatic molecule
   (2) a polyol having from 3 to 20 carbon atoms to the molecule and 3 to 7 hydroxyl groups to the molecule, and
   (3) a fatty acid.

6. Modified alkyd resins in accordance with claim 5 in which said carboxylic acid is a mixture of mono-, di- and polycarboxylic acids resulting from said metalation, carbonation and acidification reactions.

7. Modified alkyd resins in accordance with claim 5 in which the fatty acid is a saturated fatty acid having 6 to 24 carbon atoms per molecule.

8. Modified alkyd resins in accordance with claim 5 in which the fatty acid is an unsaturated fatty acid having 12 to 26 carbon atoms per molecule.

9. Modified alkyd resins in accordance with claim 8 in which the unsaturated fatty acid is dehydrated castor oil fatty acids.

10. Modified alkyd resins in accordance with claim 8 in which the unsaturated fatty acid is linoleic acid.

11. The modified alkyd resin reaction product of
    (1) about 36.5% by weight of a carboxylic acid prepared from solvent extracts obtained in the solvent refining of mineral lubricating oils using a solvent selective for aromatic compounds, by reaction of said solvent extracts with an alkali metal to form the alkali metal adduct, carbonation of said adduct to form the corresponding alkali metal salt of a carboxylic acid and acidification of said salt to form the free acid, said carboxylic acid being thus characterized by having complex, polynuclear, aromatic, alkyl-aromatic and heterocyclic nuclei predominating in carbon and hydrogen, containing about 2.0 to 4.5% by weight of combined sulfur and also containing oxygen and nitrogen, having an average molecular weight of about 320 to 600, and having about 1.7 to 3.5 average number of aromatic rings per mean aromatic molecule,
    (2) about 12.1% by weight of glycerol, and
    (3) about 51.3% by weight of linoleic acid.

12. The modified alkyd resin reaction product of
    (1) about 36.5% by weight of a carboxylic acid prepared from solvent extracts obtained in the solvent refining of mineral lubricating oils using a solvent selective for aromatic compounds, by reaction of said solvent extracts with an alkali metal to form the alkali metal adduct, carbonation of said adduct to form the corresponding alkali metal salt of a carboxylic acid and acidification of said salt to form the free acid, said carboxylic acid being thus characterized by having complex, polynuclear, aromatic, alkyl-aromatic and heterocyclic nuclei predominating in carbon and hydrogen, containing about 2.0 to 4.5% by weight of combined sulfur and also containing oxygen and nitrogen, having an average molecular weight of about 320 to 600, and having about 1.7 to 3.5 average number of aromatic rings per mean aromatic molecule
    (2) about 12.1% by weight of glycerol, and
    (3) about 51.3% by weight of dehydrated castor oil acids.

13. The modified alkyd resin reaction product of
    (1) about 36.2% by weight of a carboxylic acid prepared from solvent extracts obtained in the solvent refining of mineral lubricating oils using a solvent selective for aromatic compounds, by reaction of said solvent extracts with an alkali metal to form the alkali metal adduct, carbonation of said adduct to form the corresponding alkali metal salt of a carboxylic acid, said carboxylic acid being thus characterized by having complex, polynuclear, aromatic, alkyl-aromatic and heterocyclic nuclei predominating in carbon and hydrogen, containing about 2.0 to 4.5% by weight of combined sulfur and also containing oxygen and nitrogen, having an average molecular weight of about 320 to 600, and having about 1.7 to 3.5 average number of aromatic rings per mean aromatic molecule, and acidification of said salt to form the free acid,
    (2) about 12.8% by weight of pentaerythritol, and
    (3) about 50.9% by weight of dehydrated castor oil acids.

14. The modified alkyd resin reaction product of
    (1) about 46.4% by weight of a carboxylic acid prepared from solvent extracts obtained in the solvent refining of mineral lubricating oils using a solvent selective for aromatic compounds, by reaction of said solvent extracts with an alkali metal to form the alkali metal adduct, carbonation of said adduct to form the corresponding alkai metal salt of a carboxylic acid and acidification of said salt to form the free acid, said carboxylic acid being thus characterized by having complex, polynuclear, aromatic, alkyl-aromatic and heterocyclic nuclei predominating in carbon and hydrogen, containing about 2.0 to 4.5% by weight of combined sulfur and also containing oxygen and nitrogen, having an average molecular weight of about 320 to 600, and having about 1.7 to 3.5 average number of aromatic rings per mean aromatic molecule,
(2) about 12.3% by weight of glycerol, and
(3) about 41.3% by weight of dehydrated castor oil acids.

15. The modified alkyd resin reaction product of
(1) about 64.0% by weight of a carboxylic acid prepared from solvent extracts obtained in the solvent refining of mineral lubricating oils using a solvent selective for aromatic compounds, by reaction of said solvent extracts with an alkali metal to form the alkali metal adduct, carbonation of said adduct to form the corresponding alkali metal salt of a carboxylic acid and acidification of said salt to form the free acid, said carboxylic acid being thus characterized by having complex, polynuclear, aromatic, alkyl-aromatic and heterocyclic nuclei predominating in carbon and hydrogen, containing about 2.0 to 4.5% by weight of combined sulfur and also containing oxygen and nitrogen, having an average molecular weight of about 320 to 600, and having about 1.7 to 3.5 average number of aromatic rings per mean aromatic molecule, and
(2) about 13% by weight of glycerol and
(3) about 22.8% by weight of dehydrated castor oil acids.

References Cited in the file of this patent

UNITED STATES PATENTS

| | | |
|---|---|---|
| 2,970,164 | Jezl | Jan. 31, 1961 |
| 2,971,932 | Rickert | Feb. 14, 1961 |

OTHER REFERENCES

Conant et al.: J.A.C.S., volume 50 (1928), pages 542 to 550.